US012074765B2

(12) United States Patent
Jindal

(10) Patent No.: US 12,074,765 B2
(45) Date of Patent: Aug. 27, 2024

(54) REPLICATION OF VPN CONFIGURATION

(71) Applicant: VMware LLC, Palo Alto, CA (US)

(72) Inventor: Gaurav Jindal, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/965,342

(22) Filed: Oct. 13, 2022

(65) Prior Publication Data

US 2024/0129190 A1    Apr. 18, 2024

(51) Int. Cl.
*H04L 41/084* (2022.01)
*H04L 41/0816* (2022.01)
*H04L 41/0853* (2022.01)

(52) U.S. Cl.
CPC ...... *H04L 41/0846* (2013.01); *H04L 41/0816* (2013.01); *H04L 41/0856* (2013.01)

(58) Field of Classification Search
CPC ............. H04L 41/0846; H04L 41/0816; H04L 41/0856
See application file for complete search history.

(56) References Cited

U.S. PATENT DOCUMENTS

| 9,323,820 | B1 * | 4/2016 | Lauinger | G06F 16/1844 |
| 10,042,657 | B1 * | 8/2018 | Lauinger | H04L 67/1097 |
| 10,264,058 | B1 * | 4/2019 | Lauinger | H04L 12/4625 |
| 10,560,431 | B1 * | 2/2020 | Chen | H04L 63/18 |
| 2009/0288084 | A1 * | 11/2009 | Astete | G06Q 30/02 |
| | | | | 718/1 |
| 2015/0172148 | A1 * | 6/2015 | Ishida | H04L 41/0806 |
| | | | | 709/224 |
| 2020/0195607 | A1 * | 6/2020 | Wang | H04L 41/0893 |
| 2022/0131827 | A1 * | 4/2022 | Gao | H04L 12/4633 |

OTHER PUBLICATIONS

Mansouri et al., "An automated implementation of hybird cloud for performance evaluation of diistributed dates", Journal of Network and Computer Applications, Jun. 2020.*
Xue et al., "On automated cloud bursting and hybrid cloud setups using Apache Mesos", 2017 3rd International Conference of Cloud Computing Technologies and Applications (Cloud Tech), IEEE Publishing, Oct. 2017.*
Wood et al., "CloudNet: Dynamic Pooling of Cloud Resources by Live WAN Migration of Virtual Machines", IEEE/ACM Transactions on Networking, vol. 23, No. 5, Oct. 2015.*
Luo et al., "VirtualTransits: a Flexible Platform for Network Virtualization across Data Centers", International Conference on Cloud Computing Technology and Science, 2014.*
Arashloo et al., "A Scalable VPN Gateway for Multi-Tenant Cloud Services", ACM SIGCOMM Computer Communication Review, Apr. 27, 2018 , vol. 48, Issue 1, pp. 49-55.*

* cited by examiner

*Primary Examiner* — Todd L Barker
(74) *Attorney, Agent, or Firm* — Quarles & Brady LLP

(57) ABSTRACT

Some embodiments provide a method for automatically configuring VPN gateways. The method receives a first configuration for a first VPN gateway located at a first datacenter. The configuration includes configuration data for a first set of VPNs connecting a first set of networks at the first datacenter to other networks at other datacenters. The method automatically modifies the configuration data to generate a second configuration for a second VPN gateway. The method configures the second VPN gateway using the second configuration to setup a second set of VPNs connecting a second set of networks to the other networks at the other datacenters.

20 Claims, 7 Drawing Sheets

REPLICATION OF VPN CONFIGURATION

BACKGROUND

As datacenters expand to multiple sites and into the cloud, virtual private networks (VPNs) connecting multiple sites have become common in order to securely send traffic between sites. These VPNs can be time-consuming to setup, especially as the number of datacenters (and thus the number of necessary VPNs) increases for an enterprise. Typically, for a VPN connection between two sites, a network administrator at one (or both) of the sites needs to configure a VPN gateway at the site to properly establish the VPN connection with the other site. As such, techniques for reducing the time and resources required for such configuration is increasingly important.

BRIEF SUMMARY

Some embodiments provide a method for automatically configuring a new virtual private network (VPN) gateway based on the configuration of an existing VPN gateway, so that the new VPN gateway is configured to establish VPN configurations with the same set of other datacenters as the existing VPN gateway. The method receives a first configuration for the existing VPN gateway specifying configuration data for a number of VPNs connecting a first set of networks (e.g., different subnets) to a number of other datacenters. The method automatically modifies the configuration data in order to generate a second configuration for the new VPN gateway, and configures the new VPN gateway based on this second configuration so as to setup new VPNs connecting a second set of networks (behind the new VPN gateway) to the other datacenters.

In different embodiments, the new VPN gateway may be located in the same datacenter as the existing VPN gateway or in a completely new datacenter. For instance, in some embodiments the VPN gateways are located in on-premises and/or branch datacenters of a multi-datacenter enterprise. The new VPN gateway might be replicated as a backup to the existing VPN gateway at the same on-premises datacenter as the existing VPN gateway or at a different backup site. In other cases, the new VPN gateway is replicated so as to replace the existing VPN gateway, which can be shut down once the new VPN gateway is up and running.

In other embodiments, the VPN gateways are located in virtual datacenters that are established for an enterprise in a public cloud. Such virtual datacenters include both network endpoints (e.g., application data compute nodes) and management components (e.g., network manager and network controller components) that configure the network within the virtual datacenter. Though operating within a public cloud, in some embodiments the virtual datacenters are assigned to dedicated host computers in the public cloud (i.e., host computers that are not shared with other tenants of the cloud). In this case, the new VPN gateway is typically configured within a new virtual datacenter, either as a backup to the existing virtual datacenter or to replace the existing virtual datacenter.

The replication of the configuration may be performed by a network management or orchestration application that manages multiple datacenters, in some embodiments. That is, a network management or orchestration application retrieves the configuration from the existing VPN gateway, identifies information about the new VPN gateway (e.g., a public network address of the new VPN gateway) needed to perform the modifications to the configurations, generates the modified configuration, and uses that modified configuration to configure the VPN connections on the new VPN gateway. The network management or orchestration application, in this case, is capable of communication with both the existing and new VPN gateways.

In other embodiments, the configuration replication is handled by on-demand plug-ins that are instantiated at each of the existing and new datacenters. The plug-in at the existing datacenter retrieves the configuration from the existing VPN gateway and provides this configuration to the plug-in at the new datacenter via a plug-in to plug-in connection. The plug-in at the new datacenter is then able to generate the modified configuration using information that it can retrieve from the new VPN gateway (e.g., its public network address) and configure the new VPN gateway using the modified configuration.

The modifications to the configuration data for a given VPN connection can vary based on the type of VPN as well as other factors. For instance, some embodiments modify different configuration data for route-based VPNs as compared to policy-based VPNs. For route-based VPNs, in some embodiments the configuration data defining the VPN connection includes a local network address (e.g., IP address) and a local ID, a peer network address and peer ID (i.e., for the remote VPN gateway at the other datacenter), local and remote routing protocol (e.g., BGP) virtual tunnel interfaces (VTIs) for a routing protocol session, and local and remote autonomous system numbers (ASNs). The method of some embodiments modifies the local network address and local ID to match that of the new VPN gateway using, e.g., a public network address of the new VPN gateway and/or a private network address of the new VPN gateway to be used for specific VPN connections. In addition, some embodiments modify the routing protocol configuration data, which in some cases requires modification of the remote VTI as well because each VTI is only applicable to a single routing protocol session.

For policy-based VPNs, in some embodiments the configuration data defining the VPN connection includes a local network address and local ID, a peer network address and peer ID, and local and remote networks (e.g., IP subnets) for which the policy-based VPN should be used. The method of some embodiments modifies the local network address and local ID to match that of the new VPN gateway for policy-based VPNs as well. In addition, the local subnets to which the VPN applies need to be modified to match the corresponding local subnets at the new datacenter rather than those at the old datacenter.

For both policy-based and route-based VPNs, some embodiments also determine the type (e.g., vendor) of the peer (remote) gateway. Certain types of VPN gateways are configured such that they can only connect to a single peer (i.e., the existing VPN gateway in this case) and thus a new VPN cannot be easily established from the new VPN gateway. In this case, the method uses a dummy peer network address and ID, and alerts an administrator to manually configure this with the correct data once it can be discovered.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for automatically configuring a new virtual private network (VPN) gateway based on the configuration of an existing VPN gateway, so that the new VPN gateway is configured to establish VPN configurations with the same set of other datacenters as the existing VPN gateway. The method receives a first configuration for the existing VPN gateway specifying configuration data for a number of VPNs connecting a first set of networks (e.g., different subnets) to a number of other datacenters. The method automatically modifies the configuration data in order to generate a second configuration for the new VPN gateway, and configures the new VPN gateway based on this second configuration so as to setup new VPNs connecting a second set of networks (behind the new VPN gateway) to the other datacenters.

In different embodiments, the new VPN gateway may be located in the same datacenter as the existing VPN gateway or in a completely new datacenter. For instance, in some embodiments the VPN gateways are located in on-premises and/or branch datacenters of a multi-datacenter enterprise. The new VPN gateway might be replicated as a backup to the existing VPN gateway at the same on-premises datacenter as the existing VPN gateway or at a different backup site. In other cases, the new VPN gateway is replicated so as to replace the existing VPN gateway, which can be shut down once the new VPN gateway is up and running.

Figure 1:
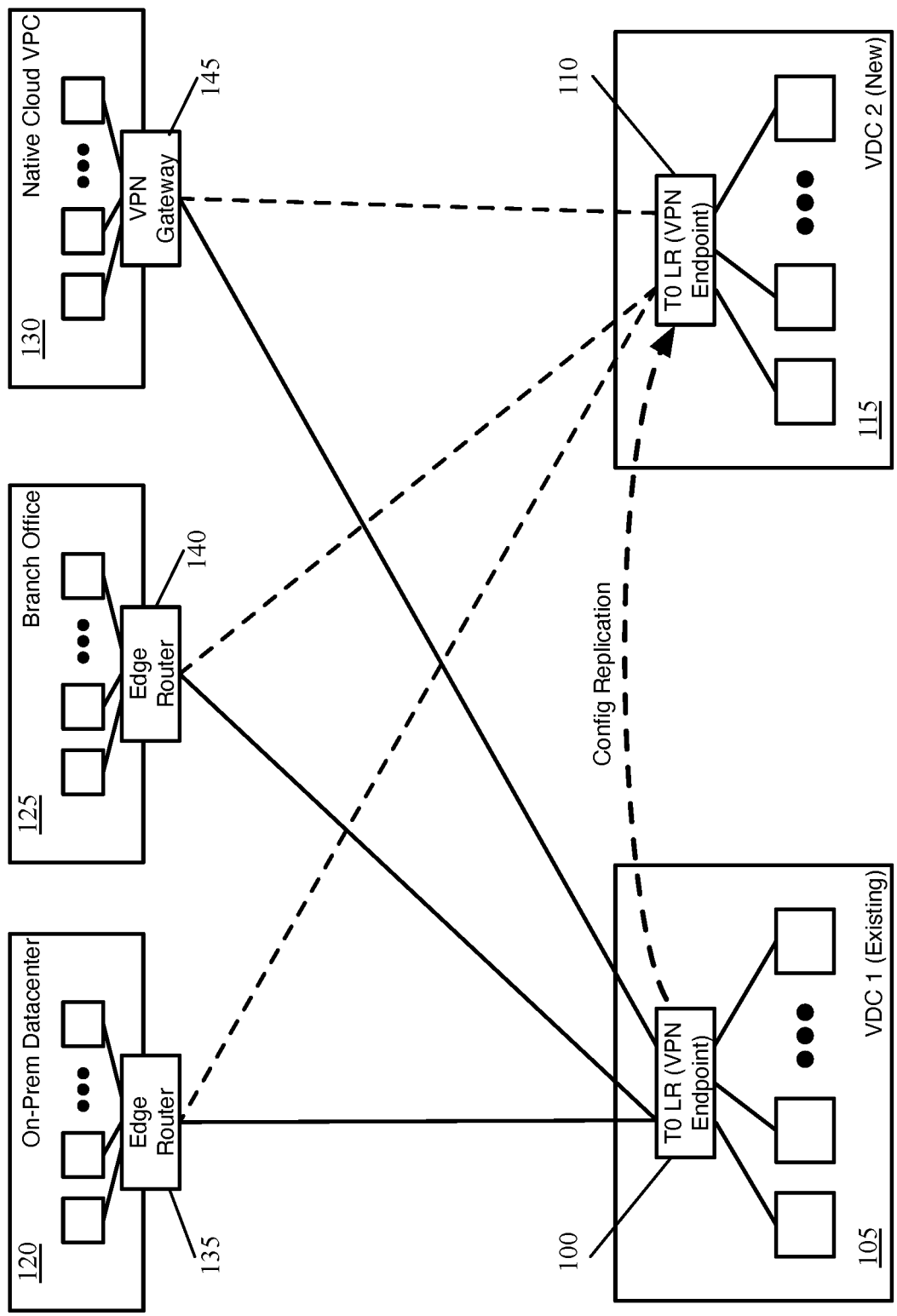
FIG. 1 conceptually illustrates the replication of a VPN gateway configuration from a first, existing VPN endpoint in a first virtual datacenter to a second, new VPN endpoint in a second virtual datacenter.

In other embodiments, the VPN gateways are located in virtual datacenters that are established for an enterprise in a public cloud. FIG. 1 conceptually illustrates the replication of a VPN gateway configuration from a first, existing VPN endpoint 100 in a first virtual datacenter 105 to a second, new VPN endpoint 110 in a second virtual datacenter 115. Each of the virtual datacenters includes both network endpoints (e.g., application data compute nodes) and management components (e.g., network manager and network controller components) that configure the network within the virtual datacenter. Though operating within a public cloud, in some embodiments the virtual datacenters are assigned to dedicated host computers in the public cloud (i.e., host computers that are not shared with other tenants of the cloud). Virtual datacenters are described in greater detail in U.S. patent application Ser. No. 17/852,917, which is incorporated herein by reference.

In a virtual datacenter of some embodiments, both management and compute logical network endpoints communicate with external networks via a logical router gateway (referred to here as a T0 logical router gateway). This T0 logical router gateway handles traffic entering and exiting the virtual datacenter (e.g., traffic sent to other virtual datacenters or physical on-premises datacenters, traffic between workloads at the virtual datacenter 105 and client devices connected to public networks, etc.). In some embodiments, some of this communication (e.g., communication with other datacenters belonging to the same enterprise as the virtual datacenter 105) is over VPNs, with the T0 logical router acting as the VPN endpoint for these VPNs. That is, the VPN traffic is encrypted between the T0 logical router and the peer endpoint at another datacenter.

In this example, the T0 logical router 100 acts as an endpoint for three different VPNs, connecting the virtual datacenter 105 to an on-premises datacenter 120, a branch office 125, and a native virtual private cloud (VPC) 130 in a public cloud (either the same public cloud that hosts the virtual datacenter 105 or a different public cloud). In this example, the T0 logical router uses one interface (e.g., a public IP address) for the VPNs connecting to edge routers 135 and 140 at the on-premises datacenter 120 and branch office 125 and a second interface (e.g., a private IP address specific for VPN communication within a single public cloud provider) for the VPN connecting to a VPN gateway 145 at the native cloud VPC 130. Different embodiments may use a different interface for each VPN, the same interface for all VPNs, or a combination thereof.

As mentioned, the VPN configuration for the first (previously existing) T0 logical router 100 is replicated to the second (new) T0 logical router 110 in the new virtual datacenter 115. In different cases, this new virtual datacenter 115 may be instantiated as a replica virtual datacenter while the first virtual datacenter 105 remains operational (e.g., for backup/disaster recovery purposes, etc.) or as a replacement for the first virtual datacenter 105. In the latter case, the virtual datacenter 105 is taken down after the new virtual datacenter 115 and all of its VPNs are fully operational.

Rather than requiring a user (e.g., an administrator) to reconfigure all of the VPNs on the new T0 logical router gateway 110, some embodiments copy the VPN configuration for the existing T0 logical router gateway 100 while applying a set of modifications to this configuration. These modifications, which are described in detail below, change details of the configuration that are specific to the first virtual datacenter 105 and the T0 logical router gateway 110 (e.g., the local interface network address) while keeping many of the details constant so as to replicate the VPNs.

Figure 2:
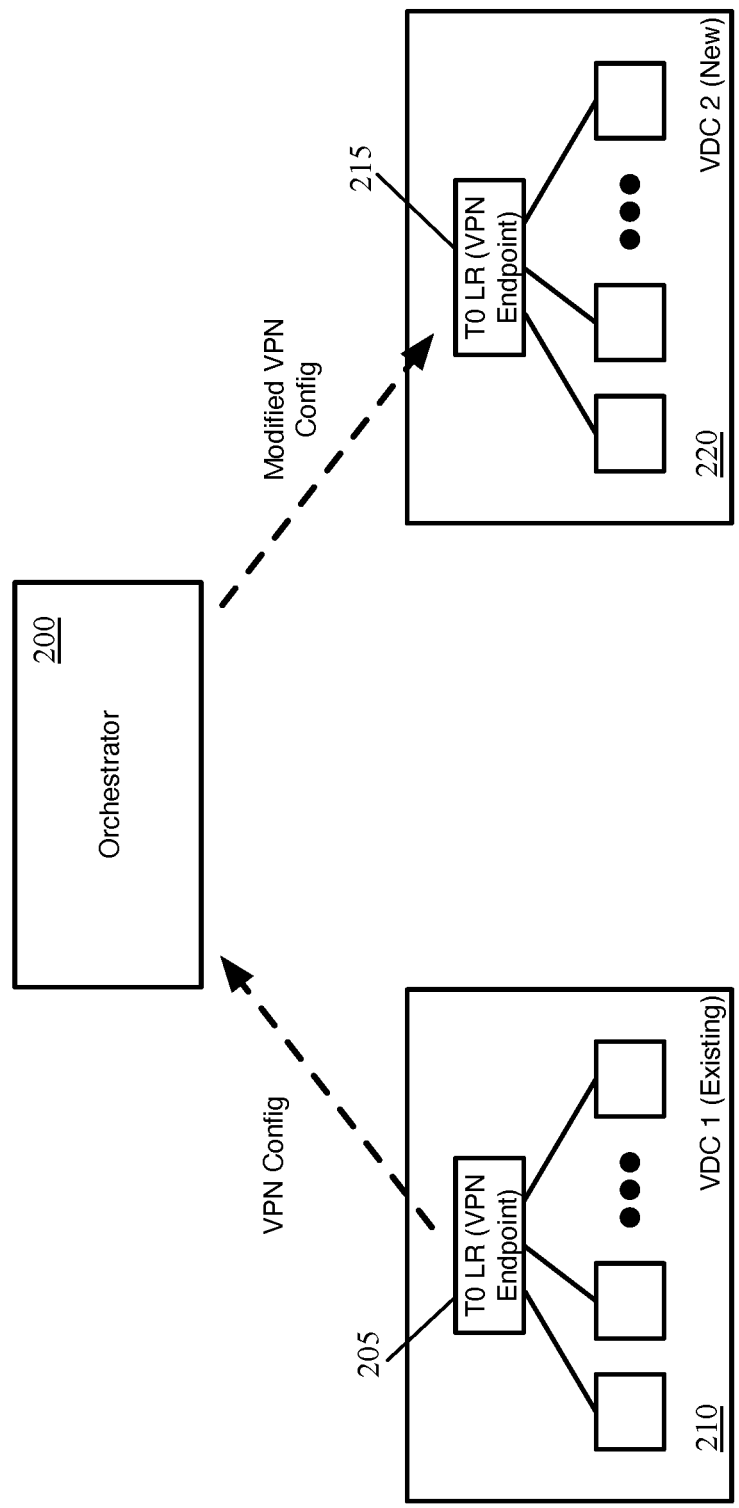
FIG. 2 conceptually illustrates an example in which an orchestrator that manages multiple datacenters performs the VPN configuration replication.

In different embodiments, different entities perform the replication of the VPN configuration. FIG. 2 conceptually illustrates an example in which an orchestrator 200 that manages multiple datacenters performs the VPN configuration replication. In various embodiments, an orchestrator, network management or controller application, or other entity that manages multiple datacenters for an enterprise performs these operations. As shown, the orchestrator 200 retrieves the VPN configuration from the existing VPN gateway 205 at the existing virtual datacenter 210. The orchestrator 200 also identifies information about the new VPN gateway 215 (e.g., the public network address of the new VPN gateway). The orchestrator 200 stores this information as part of its datacenter management functionality in some embodiments, while in other embodiments the orchestrator 200 contacts the new VPN gateway 215 or a network management component at the virtual datacenter 220 to retrieve the information. The orchestrator 200 then uses this information to perform the modifications to the VPN configuration and uses that modified configuration to configure the VPN connections on the new VPN gateway.

Such an orchestrator 200 or similar network management and/or control application could also perform similar operations to replicate and modify a VPN configuration for an on-premises datacenter (e.g., for a new VPN endpoint at the same datacenter or a different on-premises datacenter). In some embodiments, the operations performed to modify the VPN configuration are similar irrespective of the type of datacenter.

Figure 3:
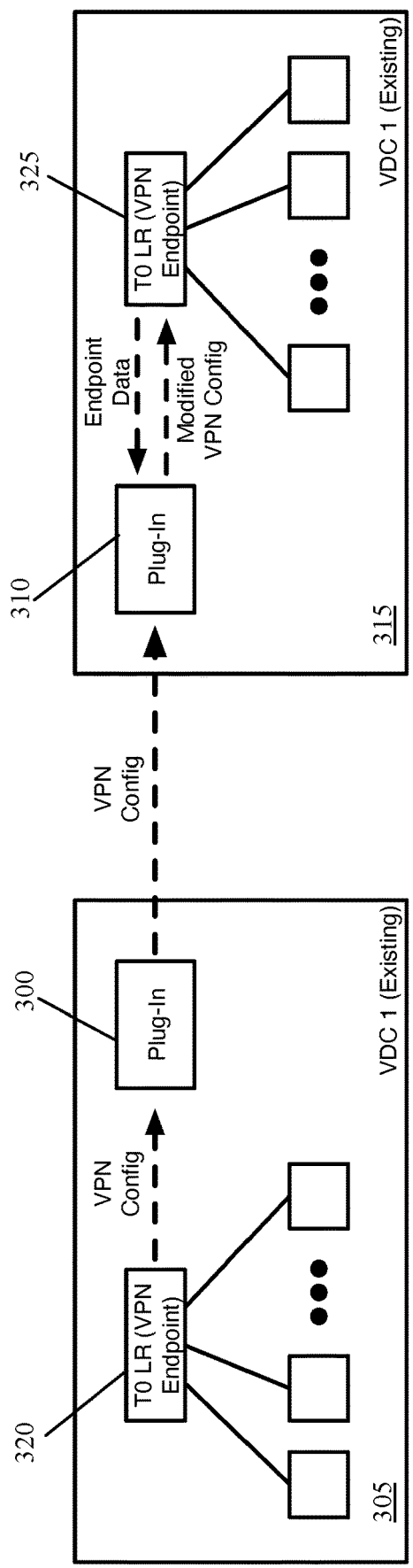
FIG. 3 conceptually illustrates a first plug-in at an existing virtual datacenter coordinate with a second plug-in at a new virtual datacenter to replicate a VPN configuration from a first VPN endpoint at the existing virtual datacenter to a second VPN endpoint at the new virtual datacenter.

In other embodiments, the configuration replication is handled by on-demand plug-ins that are instantiated at each of the existing and new datacenters. FIG. 3 conceptually illustrates a first plug-in 300 at an existing virtual datacenter 305 coordinate with a second plug-in 310 at a new virtual datacenter 315 to replicate a VPN configuration from a first VPN endpoint 320 at the existing virtual datacenter 305 to a second VPN endpoint 325 at the new virtual datacenter 315. As shown, the first plug-in 300 retrieves the VPN configuration from the first VPN endpoint 320 and transmits this VPN configuration (e.g., via a plug-in to plug-in connection) to the second plug-in 310. The second plug-in retrieves the VPN endpoint data (e.g., the interface network address, etc.) for the second VPN endpoint 325, uses this information to modify the configuration received from the first plug-in 300, and configure the second VPN endpoint 325 using the modified configuration.

The plug-in at the existing datacenter retrieves the configuration from the existing VPN gateway and provides this configuration to the plug-in at the new datacenter via a plug-in to plug-in connection. The plug-in at the new datacenter is then able to generate the modified configuration using information that it can retrieve from the new VPN gateway (e.g., its public network address) and configure the new VPN gateway using the modified configuration.

Figure 4:
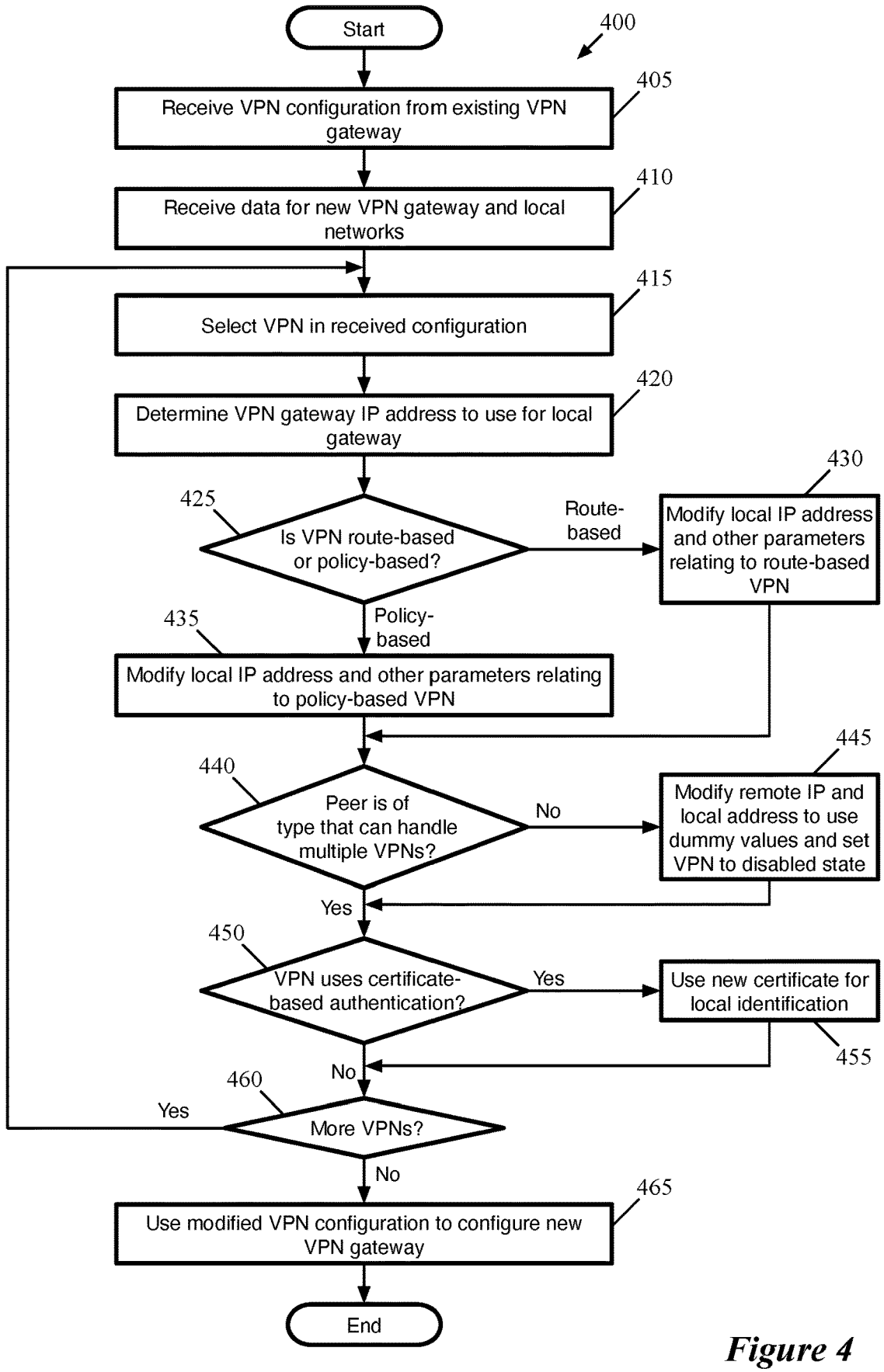
FIG. 4 conceptually illustrates a process of some embodiments for replicating a VPN configuration for a new VPN endpoint based on the configuration of an existing VPN configuration.

FIG. 4 conceptually illustrates a process 400 of some embodiments for replicating a VPN configuration for a new VPN endpoint based on the configuration of an existing VPN configuration. As described, the process 400 may be performed by different entities in different embodiments. For instance, the process could be performed by an orchestration or network management/control application that manages multiple datacenters, as shown in FIG. 2. For replication to another VPN gateway within the same datacenter (e.g., within an on-premises datacenter), a network management and/or network control application within the datacenter could perform the process 400. In other embodiments, a plug-in that is instantiated on-demand (e.g., in the datacenter with the new VPN endpoint) performs the process 400 in concert with a corresponding plug-in instantiated in the other datacenter (e.g., the datacenter with the source VPN endpoint for the configuration). The process 400 will be described in part by reference to FIGS. 5 and 6, which illustrate the modification of example VPN configurations.

As shown, the process 400 begins by receiving (at 405) a VPN configuration from an existing VPN gateway (the VPN configuration source). In some embodiments, the process (e.g., a plug-in, network manager or orchestrator, etc.) sends a request to the existing VPN gateway in order to retrieve this configuration. The VPN configuration, in some embodiments, includes configuration data for each of the VPNs for which the VPN gateway is an endpoint, which in many cases can number in the dozens or even hundreds.

The configuration data for a given VPN can include values for many different parameters, depending in part on whether a given VPN is a route-based or policy-based VPN. In some embodiments, for a route-based VPN these parameters can include (i) Internet Key Exchange (IKE) phase 1 parameters, (ii) IPsec phase 2 parameters, (iii) IPsec Dead Peer Detection (DPD) settings, (iv) IPsec VPN session configuration parameters, (v) local IP address and identifier (ID), (vi) virtual tunnel interface (VTI) parameters, and/or (vii) Border Gateway Protocol (BGP) configuration.

The following provides an example of a set of VPN configuration parameters for a route-based VPN:

IKE Phase 1 Parameters
    IKE Version: IKE_V2
    Connection initiation mode: INITIATOR
    Authentication mode: PSK
    Pre shared key: xxx123
    Authentication algorithm: SHA2_256
    Encryption algorithm: AES_256
    Security association (SA) lifetime: 86400
    Negotiation: N/A for IKE_V2
    Diffie-Hellman (DH) group: Group14
    Pseudo-random function (PRF) algorithm: SHA2_256
IPsec Phase 2 Parameters
    Transform protocol: ESP
    Authentication algorithm: SHA2_256
    SA lifetime: 3600
    Encryption algorithm: AES_256
    Encapsulation mode: TUNNEL MODE
    Enable perfect forward secrecy: true
    Perfect forward secrecy DH group: Group14
IPsec DPD Settings
    DPD enabled: true
    DPD probe interval: 60
IPsec VPN session configuration
    Peer address: 66.170.99.11 (peer gateway public IP)
    Peer ID: 66.170.99.11
    Peer subnet: 0.0.0.0/0
    Local address: 44.228.47.199 (local public IP)
    Local ID: 44.228.47.199
    Local subnet: 0.0.0.0/0
VTI Parameters
    Peer VTI address: 10.10.10.1
    Local VTI address: 10.10.10.2
    Tunnel interface MTU: 1500 bytes
BGP Configuration
    BGP neighbor IP: 10.10.10.1
    BGP neighbor autonomous system (AS) number: 7224
    BGP local IP: 10.10.10.2

BGP local AS number: 65000
BGP hold-down time: 180
BGP keep-alive timer: 60
BFD status: false For a policy-based VPN, many of the parameters are the same (e.g., IKE phase 1 parameters, IPsec phase 2 parameters, IPsec DPD settings, and IPsec VPN session configuration). However, rather than VTI parameters and BGP configuration parameters, a policy-based VPN in some embodiments has policy rules (e.g., specifying source and destination subnets that should be sent over the VPN). It should also be noted that, for route-based or policy-based VPNs, rather than using a pre-shared key for authentication (e.g., using IKE), some embodiments use a digital certificate-based authentication. In this case, the local certificate is included in the configuration data retrieved by the entity performing the process 400 in some embodiments.

The process 400 also receives (at 410) data for the new VPN gateway and local networks located behind the VPN gateway (e.g., local networks for which data traffic should be sent using a given policy-based VPN). When the process is performed by an orchestrator or network manager and/or controller, that entity either stores this information already or can retrieve the information from the VPN gateway (or from a network manager or controller located at the datacenter with the new VPN gateway). If the process is performed by a plug-in located at the same datacenter as the new VPN gateway, then the plug-in typically retrieves this information from the VPN gateway or from a network manager or controller located at that datacenter.

The received data for the new VPN gateway includes information about the various interfaces of the VPN gateway in some embodiments, specifically those interfaces to be used as IP addresses for its VPNs. In some embodiments, the VPN gateway will typically include at least one interface with a public IP address as well as one interface with a private IP address. The former can be used for VPNs that will be sent (encrypted) across the public Internet, while the latter is used for connections to, e.g., VPN endpoints at a specific cloud provider (e.g., the same cloud provider as that on which the old and/or new VPN gateway is hosted). For instance, a virtual datacenter hosted on an AWS public cloud may use a specific type of VPN to connect to a VPC or another virtual datacenter hosted on another AWS public cloud. The process also receives data regarding the local networks (e.g., the subnet addresses) located behind the new VPN gateway, as these may be needed to define the policy-based VPNs.

Next, the process 400 selects (at 415) one of the VPNs in the received VPN configuration. It should be understood that the process 400 is a conceptual process and that the actual entity (e.g., the plug-in, network orchestrator, etc.) performing the VPN configuration modification may not perform the operations 420-455 serially on each VPN in a configuration. Rather, this entity will often perform these operations to modify the configuration data for many VPNs in parallel.

For the selected VPN, the process 400 determines (at 420) the VPN gateway address to use for the local gateway in the VPN configuration. That is, if the VPN gateway has multiple interfaces that can be used for different VPNs, the process 400 determines which of these will be used for the currently-selected VPN. In some embodiments, this is a matter of identifying the type of interface (e.g., the type of IP address) used for the local IP address in the VPN configuration received from the existing VPN gateway and matching that type to the available interface addresses for the new VPN gateway. That is, if the local IP address for the received configuration data for the selected VPN is a public IP address, then the modified configuration data will use the public IP address of the new VPN gateway.

Next, the process 400 determines (at 425) whether the selected VPN is a route-based VPN or a policy-based VPN. As noted above, the configuration data for route-based VPNs has many overlapping parameters with the configuration data for policy-based VPNs, but there are several parameters defining each type of VPN that are not part of the configuration for the other type of VPN.

Figure 5:
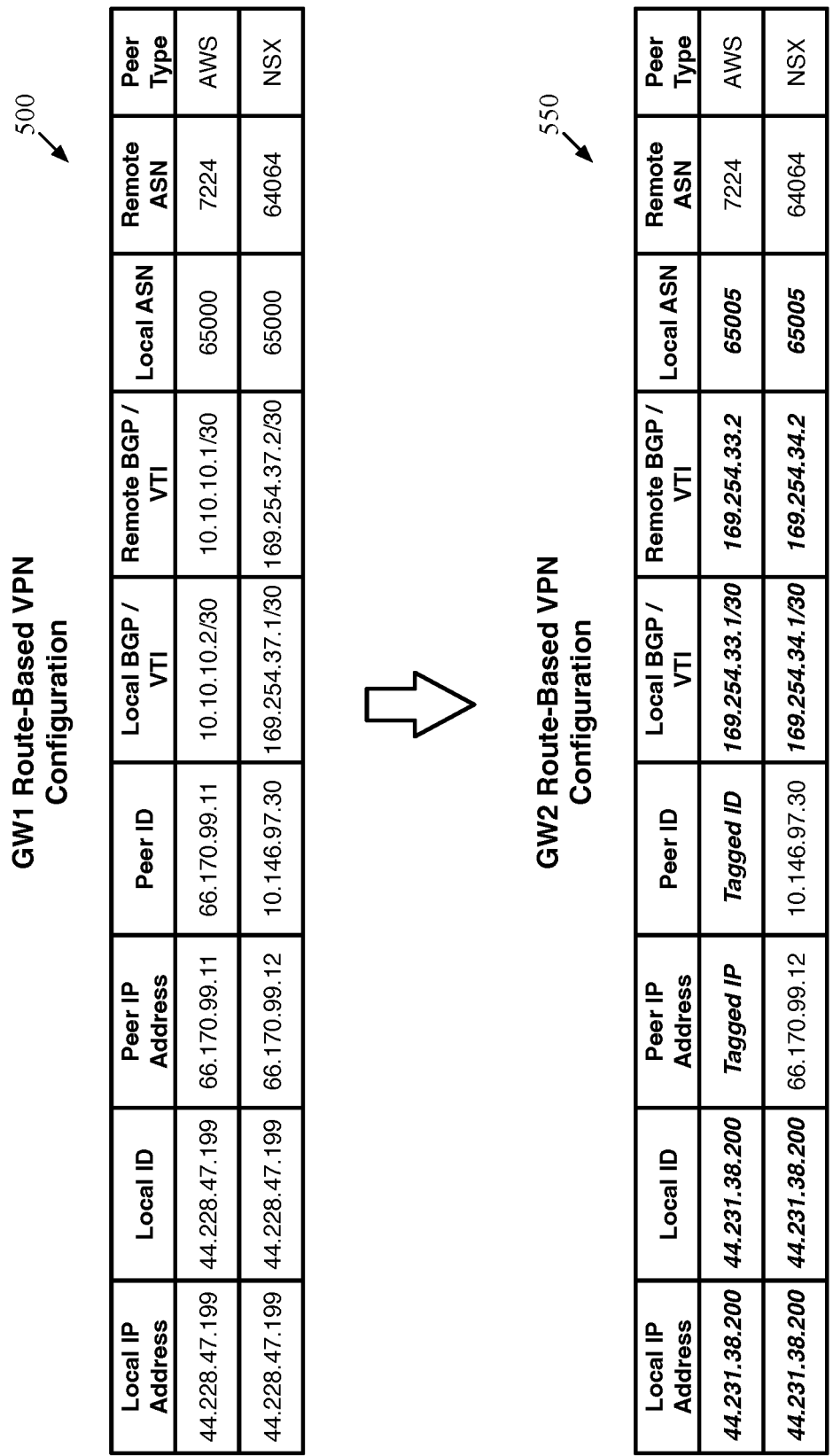
FIGS. 5 and 6 illustrate the modification of example VPN configurations.

If the VPN is a route-based VPN, the process 400 modifies (at 430) the local IP address and other parameters relating to the route-based VPN. These other parameters, in some embodiments, include the local ID and at least a subset of the BGP/VTI parameters. FIG. 5 illustrates a first table 500 showing a subset of configuration data for a set of route-based VPNs at an existing VPN gateway (GW1) and a second table 550 showing how the configuration data is modified for configuring a new VPN gateway (GW2). The first table 500 includes configuration data for two route-based VPNs. Both of these route-based VPNs use the same local IP address (44.228.47.199) and local ID, but connect to different peer IP addresses (because they are different VPNs). In addition, both the local and remote VTP/VTI IP addresses are different between the two VPNs, while the local ASNs are the same and the remote ASNs are different.

In the second table 550, the modified configuration data is shown bolded and italicized. First, the entity performing the modification changes the local IP address (and local ID) to match that of the interface of the new local VPN gateway (i.e., the public IP address of that gateway, because the public IP address of the existing gateway was used in the retrieved configuration data shown in the first table 500). In addition, both the local and remote BGP/VTI addresses are changed for both VPNs, as well as the local ASN. In some embodiments, the local and remote BGP/VTI parameters are only modified if the new datacenter is an extension of the existing datacenter (e.g., as a backup), because (i) the local BGP/VTI address cannot be duplicated between two sites and (ii) the remote BGP/VTI address is only applicable to a single session. On the other hand, if the existing datacenter (and thus the existing VPN gateway) is going to be deleted after the new datacenter is up and running, then some embodiments copy over all of the BGP/VTI parameters without modification. In some embodiments, the local ASN can be modified or remain the same, depending on a user choice. The new BGP/VTI parameters are generated manually in some embodiments, while in other embodiments these parameters are generated using the processes described in U.S. Pat. No. 11,184,237, which is incorporated herein by reference.

Figure 6:
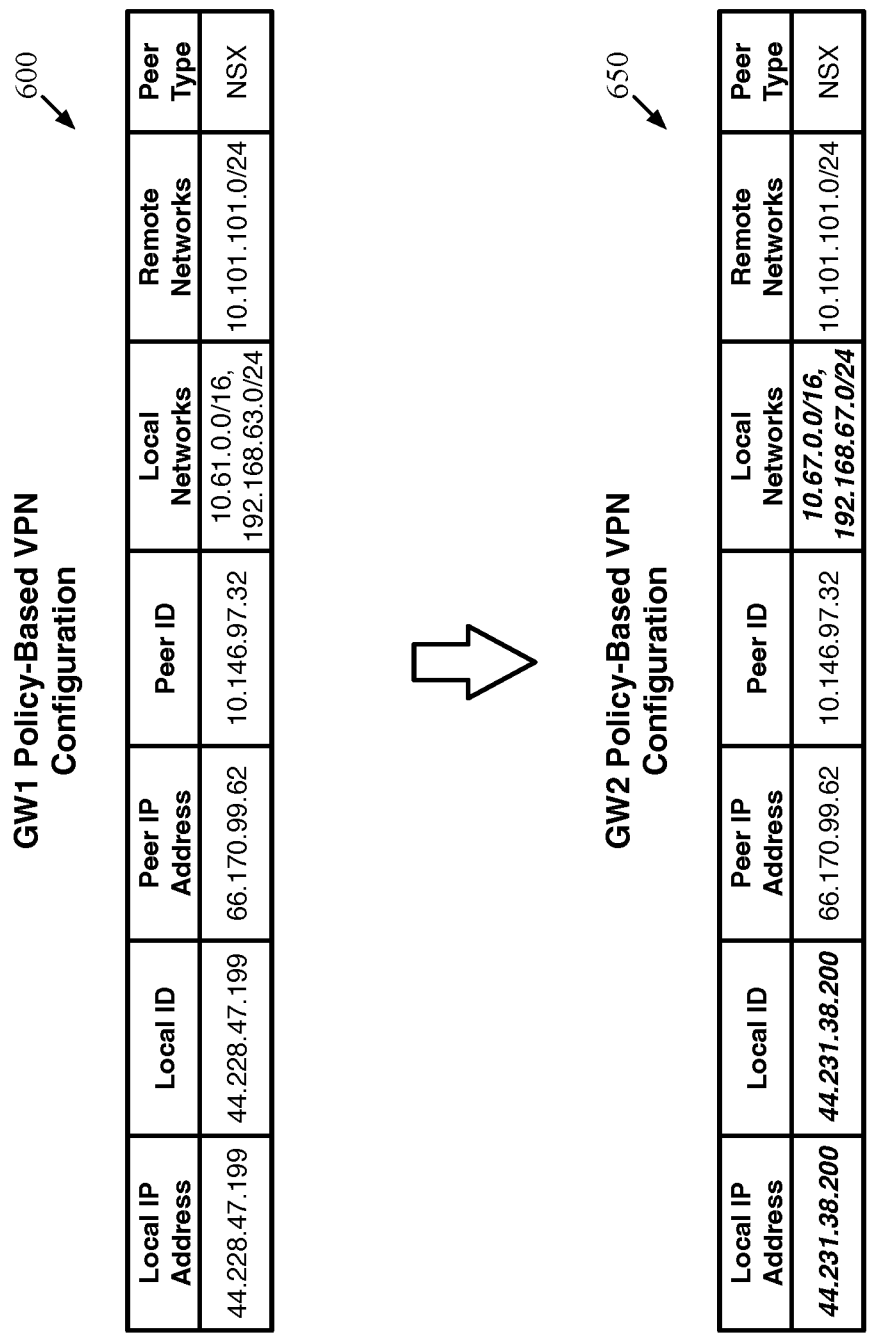

On the other hand, if the VPN is a policy-based VPN, the process 400 modifies (at 435) the local IP address and other parameters relating to the policy-based VPN. These other parameters, in some embodiments, include the local networks to which the policy-based VPN applies. FIG. 6 illustrates a first table 600 showing a subset of configuration data for a policy-based VPN at an existing VPN gateway (GW1) and a second table 650 showing how the configuration data is modified for configuring a new VPN gateway (GW2). The first table 600 includes configuration data for one policy-based VPN. This policy-based VPN uses the same local IP address (44.228.47.199) and local ID as the route-based VPNs, while connecting to a different peer IP address. In addition, there are no BGP/VTI parameters because policy-based VPNs do not use a routing protocol session in the way that route-based VPNs do. Instead, the policy defining which traffic is sent over the VPN is specified in terms of local and remote subnets.

In the second table 650, the modified configuration data is shown bolded and italicized. First, the entity performing the modification changes the local IP address (and local ID) to match that of the interface of the new local VPN gateway (i.e., the public IP address of that gateway, because the public IP address of the existing gateway was used in the retrieved configuration data shown in the first table 600). In addition, the local subnets are changed to match those of the new datacenter. In some embodiments, like with the BGP/VTI addresses, if the new datacenter is replacing the existing datacenter, these local networks may stay the same. However, if the new datacenter is going to be an extension of the existing datacenter, then the local networks will change. In other embodiments, the local networks are modified even if the new datacenter is a replacement for the old datacenter.

The process 400 also determines (at 440) whether the peer gateway is of a type that can handle multiple VPNs. Certain types of VPN gateways are configured to only allow VPNs from a pre-approved VPN endpoint (in this case, the existing VPN gateway), and thus the remote peer address and ID will need to be different. For instance, this is a rule for certain AWS gateways. In some embodiments, the process accesses IKE logs to determine the gateway type for the peer gateway based on a vendor ID present in these logs.

If the peer gateway type cannot handle multiple VPNs, the process modifies (at 445) the remote IP address and ID to use dummy values and sets the VPN to a disabled state. In the table 500 shown in FIG. 5, the first VPN is a VPN to an AWS gateway. In this case, the second table 550 shows that the peer IP address and peer ID parameters are modified such that no address is listed (these are instead shown as tags in some embodiments). In some embodiments, an alert is raised for a user (e.g., an administrator) to ensure that the gateway is setup at the remote peer location so that the VPN can be configured correctly for the new VPN gateway. The VPN is disabled until the correct configuration can be determined. Another option, in some embodiments, is to completely remove these VPNs from the configuration (i.e., these VPNs are not replicated), allowing the administrator to setup the VPN from scratch. In some embodiments, this issue is irrespective of whether the VPN is a route-based or policy-based VPN.

In addition, the process 400 determines (at 450) whether the selected VPN uses digital certificate-based authentication. As mentioned above, rather than using a pre-shared key for authentication, some embodiments use a digital certificate-based authentication. In different embodiments, this determination may be VPN-specific or VPN gateway-specific. In the latter case, rather than making the determination for each individual VPN, the process 400 performs operations 450 and 455 once for the new VPN gateway.

If the VPN (or VPN gateway on the whole) uses certificate-based authentication, the process 400 uses (at 455) a new certificate (or set of certificates) for local identification of the new VPN gateway. In some embodiments, the local certificate from the existing VPN gateway is reused for the new VPN gateway. However, if this certificate is not available or if the existing datacenter is not being deleted, then some embodiments raise an alert to the user (e.g., administrator) to configure the certificate to be used for the new VPN configuration. In some embodiments, the process 400 automatically creates the set of certificates for the new VPN gateway as per a standard security profile received from the first VPN gateway.

Having modified the configuration for the selected VPN, the process 400 determines (at 460) whether additional VPNs remain to have their configuration data modified. If additional VPNs remain, the process 400 returns to 415 to select the next VPN and modify the configuration data for that VPN.

Once all of the VPN configuration data has been modified as needed, the process 400 uses (at 465) the modified VPN configuration to configure the new VPN gateway. In some embodiments, the entity performing the configuration modification provides this data to the new VPN gateway so that the VPN gateway can establish the various VPN sessions with the various remote peers. The process 400 then ends.

This VPN replication with modification is also applicable to replicating an L2VPN in some embodiments. In this case, the extended networks of the new datacenter need to be attached to the L2VPN session. In addition, while the above description shows the Tier-0 logical router as the VPN endpoint, in some embodiments multiple Tier-1 logical routers can act as VPN endpoints (e.g., for connection to an on-premises datacenter). Replication for these VPN configurations requires that the existing virtual datacenter be deleted after creation of the new datacenter in some embodiments.

Figure 7:
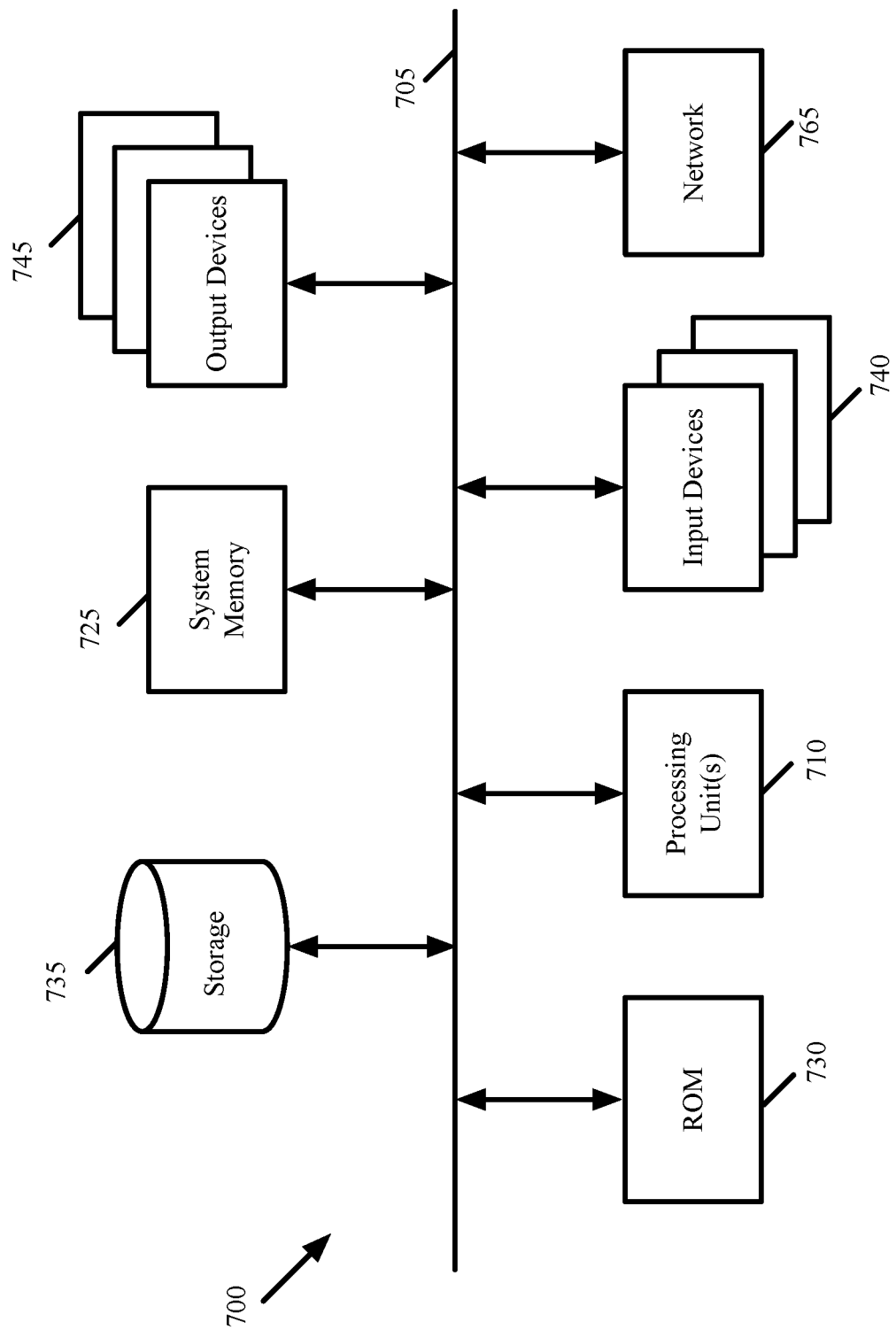
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method comprising:
    receiving a first configuration for a first virtual private network (VPN) gateway located at a first datacenter, the first configuration comprising configuration data for a first plurality of VPNs connecting a first set of networks at the first datacenter to a plurality of other networks at a plurality of other datacenters;
    automatically modifying the configuration data to generate a second configuration for a second VPN gateway; and
    configuring the second VPN gateway using the second configuration to setup a second plurality of VPNs connecting a second set of networks to the plurality of other networks at the plurality of other datacenters;

wherein the method is performed by a management application that manages the first datacenter; and
wherein automatically modifying the configuration data comprises:
  determining whether the first VPN gateway uses a set of digital certificates for authentication; and
  when the first VPN gateway uses the set of digital certificates for authentication, generating a set of new certificates for the second VPN gateway.

2. The method of claim 1, wherein the second VPN gateway and the second set of networks are located at a second, different datacenter.

3. The method of claim 2, wherein the first and second datacenters are a first virtual datacenter and a second virtual datacenter operating in one or more public cloud datacenters.

4. The method of claim 3, wherein the second virtual datacenter replaces the first virtual datacenter, wherein the first virtual datacenter is removed from the one or more public cloud datacenters after the second virtual datacenter becomes operational.

5. The method of claim 3, wherein the second virtual datacenter replicates the first virtual datacenter as a backup to the first virtual datacenter.

6. The method of claim 1, wherein the second VPN gateway and the second set of networks are also located at the first datacenter.

7. The method of claim 1, wherein automatically modifying the configuration data comprises modifying a local network address for a plurality of VPN configurations to match a network address associated with the second VPN gateway.

8. The method of claim 1, wherein automatically modifying the configuration data comprises determining whether each VPN in the configuration data is a policy-based VPN or a route-based VPN.

9. The method of claim 8, wherein automatically modifying the configuration data comprises further comprises, for each policy-based VPN, modifying a set of local networks that the policy-based VPN connects to another datacenter based on network addresses associated with the second set of networks.

10. The method of claim 8, wherein automatically modifying the configuration data further comprises, for each of a set of route-based VPNs, modifying routing protocol session settings to match information associated with the second VPN gateway.

11. The method of claim 1, wherein automatically modifying the configuration data comprises, for each VPN of a set of the first plurality of VPNs:
  determining a vendor identifier for a remote VPN gateway for the VPN; and
  when the vendor identifier indicates that the remote VPN gateway will need to be manually configured to connect to the second VPN gateway, using a dummy value for a network address of the remote VPN gateway in the modified configuration data for the VPN and disabling the VPN.

12. A non-transitory machine-readable medium storing a program for execution by at least one processing unit, the program comprising sets of instructions to be performed by a management application for:
  receiving a first configuration for a first virtual private network (VPN) gateway located at a first datacenter, the first configuration comprising configuration data for a first plurality of VPNs connecting a first set of networks at the first datacenter to a plurality of other networks at a plurality of other datacenters;
  automatically modifying the configuration data to generate a second configuration for a second VPN gateway; and
  configuring the second VPN gateway using the second configuration to setup a second plurality of VPNs connecting a second set of networks to the plurality of other networks at the plurality of other datacenters;
  wherein the set of instructions for automatically modifying the configuration data comprises sets of instructions for:
    determining whether the first VPN gateway uses a set of digital certificates for authentication; and
    when the first VPN gateway uses the set of digital certificates for authentication, generating a set of new certificates for the second VPN gateway.

13. The non-transitory machine-readable medium of claim 12, wherein:
  the second VPN gateway and the second set of networks are located at a second, different datacenter; and
  the first and second datacenters are a first virtual datacenter and a second virtual datacenter operating in one or more public cloud datacenters.

14. The non-transitory machine-readable medium of claim 13, wherein the second virtual datacenter replaces the first virtual datacenter, wherein the first virtual datacenter is removed from the one or more public cloud datacenters after the second virtual datacenter becomes operational.

15. The non-transitory machine-readable medium of claim 13, wherein the second virtual datacenter replicates the first virtual datacenter as a backup to the first virtual datacenter.

16. The non-transitory machine-readable medium of claim 12, wherein the set of instructions for automatically modifying the configuration data comprises a set of instructions for modifying a local network address for a plurality of VPN configurations to match a network address associated with the second VPN gateway.

17. The non-transitory machine-readable medium of claim 12, wherein the set of instructions for automatically modifying the configuration data comprises a set of instructions for determining whether each VPN in the configuration data is a policy-based VPN or a route-based VPN.

18. The non-transitory machine-readable medium of claim 17, wherein the set of instructions for automatically modifying the configuration data comprises further comprises a set of instructions for modifying, for each policy-based VPN, a set of local networks that the policy-based VPN connects to another datacenter based on network addresses associated with the second set of networks.

19. The non-transitory machine-readable medium of claim 17, wherein the set of instructions for automatically modifying the configuration data further comprises a set of instructions for modifying, for each of a set of route-based VPNs, routing protocol session settings to match information associated with the second VPN gateway.

20. The non-transitory machine-readable medium of claim 12, wherein the set of instructions for automatically modifying the configuration data comprises sets of instructions for, for each VPN of a set of the first plurality of VPNs:
  determining a vendor identifier for a remote VPN gateway for the VPN; and
  when the vendor identifier indicates that the remote VPN gateway will need to be manually configured to connect to the second VPN gateway, using a dummy value for a network address of the remote VPN gateway in the modified configuration data for the VPN and disabling the VPN.

\* \* \* \* \*